United States Patent
Davalos et al.

(10) Patent No.: US 10,372,093 B2
(45) Date of Patent: Aug. 6, 2019

(54) COMFORT MAPPING USING WEARABLES

(71) Applicant: Ademco Inc., Golden Valley, MN (US)

(72) Inventors: Pedro Davalos, Plymouth, MN (US); Wendy Foslien, Woodbury, MN (US); Ajay Pai, Maple Grove, MN (US)

(73) Assignee: Ademco Inc., Golden Valley, MN (US)

( * ) Notice: Subject to any disclaimer, the term of this patent is extended or adjusted under 35 U.S.C. 154(b) by 222 days.

(21) Appl. No.: 15/000,891

(22) Filed: Jan. 19, 2016

(65) Prior Publication Data

US 2016/0252267 A1 Sep. 1, 2016

Related U.S. Application Data

(60) Provisional application No. 62/121,256, filed on Feb. 26, 2015.

(51) Int. Cl.
G05B 15/02 (2006.01)

(52) U.S. Cl.
CPC ...... *G05B 15/02* (2013.01); *G05B 2219/2642* (2013.01)

(58) Field of Classification Search
CPC .................. G05B 15/02; G05B 2219/2642
See application file for complete search history.

(56) References Cited

U.S. PATENT DOCUMENTS

| | | | |
|---|---|---|---|
| 6,972,660 B1 | 12/2005 | Montgomery, Jr. et al. | |
| 7,460,899 B2 | 12/2008 | Almen | |
| 8,348,840 B2 | 1/2013 | Heit et al. | |
| 8,478,447 B2 | 7/2013 | Fadell et al. | |
| 8,630,741 B1 | 1/2014 | Matsuoka et al. | |
| 8,690,751 B2 | 4/2014 | Auphan | |
| 8,751,432 B2 | 6/2014 | Berg-Sonne et al. | |
| 2009/0057425 A1* | 3/2009 | Sullivan | F24F 11/0009 236/51 |

(Continued)

FOREIGN PATENT DOCUMENTS

JP 2005/143905 8/2005

OTHER PUBLICATIONS

What's New in Real-Time Location Systems?. Journal. [online]. Ciaran Connell, 2013[retrieved on 2017-28-17]. Retrieved from Internet: <URL: https://www.decawave.com/sites/default/files/wireless_design_and_development_nov_dec_2013.pdf>.*

(Continued)

*Primary Examiner* — Robert E Fennema
*Assistant Examiner* — Marzia T Monty
(74) *Attorney, Agent, or Firm* — Shumaker & Sieffert, P.A.

(57) ABSTRACT

The present disclosure relates to systems and methods for mapping a building space using wearable devices in order to better control the comfort level in the building. In some instances, a system compiles information such as temperature information that is provided by an individual's wearable device as the individual moves about the building over time. Using this data, the system may create and/or update a comfort map of the building, which can be used to determine how various rooms of the building heat and cool over time, as well as usage pattern of the various rooms of the building. The system can then use the comfort map of the building to better control one or more comfort sources of the building.

15 Claims, 17 Drawing Sheets

(56) References Cited

U.S. PATENT DOCUMENTS

| | | | | |
|---|---|---|---|---|
| 2010/0289643 | A1* | 11/2010 | Trundle | G08C 19/16 340/545.1 |
| 2012/0031984 | A1* | 2/2012 | Feldmeier | F24F 11/001 236/49.3 |
| 2012/0169482 | A1* | 7/2012 | Chen | G08C 17/02 340/12.52 |
| 2013/0253709 | A1 | 9/2013 | Renggli et al. | |
| 2013/0261799 | A1 | 10/2013 | Kuhlmann et al. | |
| 2014/0094707 | A1 | 4/2014 | Farringdon et al. | |
| 2014/0207292 | A1 | 7/2014 | Ramagem et al. | |
| 2016/0011660 | A1* | 1/2016 | Wieder | G06F 3/04815 345/158 |
| 2016/0040902 | A1* | 2/2016 | Shah | G01S 5/021 700/277 |
| 2016/0091877 | A1* | 3/2016 | Fullam | G05B 15/02 700/276 |

OTHER PUBLICATIONS

Elrod et al., "Responsive Office Environments," Communications of the ACM, vol. 36, No. 7, pp. 84-85, Jul. 1993.

Federspiel et al., "User Adaptable Comfort Control for HVAC Systems," Proceedings of the 1992 American Control Conference, pp. 2312-2319, Jun. 24-26, 1992.

Federspiel, "User-Adaptable and Minimum-Power Thermal Comfort Control," Doctoral Thesis at the Massachusetts Institute of Technology, 109 pages, Jun. 1992.

http://www.bigassfans.com/, "Haiku With SenseME and the Nest Learning Thermostat Work Together to Reduce Your Energy Bills—All Year Long," 4 pages, 2015.

http://www.bigassfans.com/category/press-releases, "BIG ASS Fans, Jawbone Partner for Better Sleep," 4 pages, posted Dec. 22, 2014.

Ivanov et al., "Distributed Smart Sensor System for Indoor Climate Monitoring," Konnex Scientific Conference, Munchen, 8 pages, 2002.

Keeling et al., "A Review of What Data From Sensors Worn on the Body Can Tell Us About Human Behavior," 8 pages, downloaded May 2, 2014.

Mozer "The Neural Network House: An Environment that Adapts to its Inhabitants," University of Colorado Department of Computer Science, pp. 110-114. 1998.

Nuttall, "Technology: Apps That Help You Manage Your Life," Financial Times, 2 pages, May 12, 2013.

Tse et al., "A Distributed Sensor Network for Measurement of Human Thermal Comfort Feelings," Sensors and Actuators A: Physical, vol. 144, pp. 394-402, 2008.

\* cited by examiner

COMFORT MAPPING USING WEARABLES

RELATED APPLICATIONS

This application claims the benefit of U.S. Provisional Application Ser. No. 62/121,256, filed Feb. 26, 2015, which is incorporated herein by reference.

TECHNICAL FIELD

The present disclosure relates generally to comfort systems of a building, and more particularly to systems and methods for mapping a building space using wearable devices.

BACKGROUND

In some cases, it may be desirable to building a model of thermal properties of the building in order to help anticipate future conditions within the building and to help take appropriate actions to improve the comfort for individuals within the building. Obtaining sufficient environmental data from throughout a building in order to help build a reasonably good model of the thermal properties of the building can be challenging. One approach to obtaining such information is to place multiple sensors at multiple fixed locations through the building. Each of these sensors can then report a locally sensed environmental condition to a main controller in order to help build/update a model of the building. Because a relatively large number of temperature sensors may be required, such an approach can be cost prohibitive in many application.

SUMMARY

The present disclosure relates generally to comfort systems of a building, and more particularly to systems and methods for mapping a building space using wearable devices. In some instances, a system may compile information such as temperature information that is provided by an individual's wearable device as the individual move about the building over time. The system may create a map of the building, showing how various portions of the building heat and cool over time. Over time, the system can learn that a particular portion of the building runs cooler than the rest of the building, and thus an individual's comfort may require additional use of a local comfort source and/or the temperature of the building as a whole may have to be elevated when the cooler portion of the building is expected to be in use.

The system may also create a usage map that shows what spaced within the building are used and at what times. That is, and in some instances, the system may learn over time which portions of the building various individuals tend to congregate in at various times of a day. For example, if the system determines that nobody goes upstairs until 10 pm each night, the temperature upstairs may be allowed to drift from a comfort temperature set point until 9:30 pm or so. If the system determines that someone enters the kitchen every day at 5 pm, but doesn't go anywhere else until 6 pm, the system may learn to heat (or cool) the kitchen to a comfort temperature set point, but allow the rest of the main level of the building to drift from that comfort temperature set point. The system may, for example, then heat (or cool) the rest of the main level so that the main level reaches the comfort temperature set point by 6 pm. In some cases, this local temperature control may be achieved through local comfort sources. In some cases, local comfort sources of warmth may include but are not limited to a local HVAC system vent, damper or register, a portable space heater, a gas or electric fireplace, an electric blanket and the like. Local comfort sources of cooling may include but are not limited to a window or through wall air conditioner, a local HVAC system vent, damper or register, a ceiling fan, a free-standing fan, an open window, window shades, and the like.

In some cases, a building comfort control system may include a number of wireless beacons that are disposed throughout the building and that enable triangulation of wireless signals from one or more wearable sensors in order to determine a current location of the one or more wearable sensors. While wireless beacons are used here as an example, it is contemplated that any suitable approach may be used to identify the location of the wearable sensors in the building over time. The building comfort control system may include a comfort controller configured to accept data representing a measure of comfort from the one or more wearable sensors worn or otherwise carried by one or more individuals within the building as well as the current location of the one or more wearable sensors. The comfort controller may accept the data over time to develop and maintain a two or more dimensional comfort map of the building. A global and/or local comfort sources may be operably coupled to the comfort controller, and the comfort controller may be configured to control the global and/or local comfort sources based, at least in part, on the two or more dimensional comfort map of the building.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
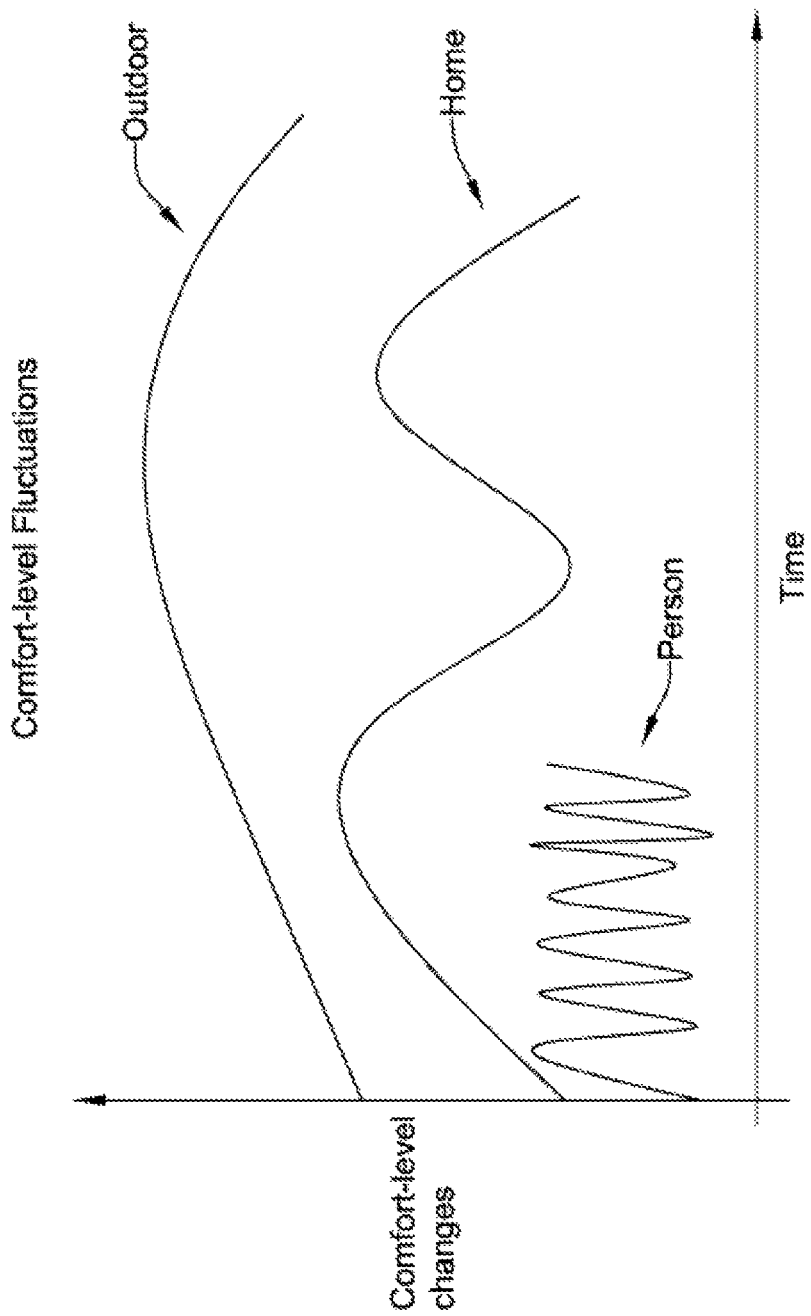
FIG. 1 is a schematic graphical representation of how outdoor, indoor and personal conditions change over time.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the claimed disclosure.

FIG. 1 is a schematic graphical representation of how outdoor, indoor and personal conditions change over time. As can be seen, outdoor conditions, such as temperature, relative humidity, wind direction, wind speed and cloud cover can vary over time. While weather conditions can sometimes change quickly, such as when a storm approaches, outdoor conditions generally ebb and flow over a relatively long time period measured in hours or days. The indoor conditions, including temperature, humidity and air-flow can fluctuate over a somewhat shorter time period measured in minutes or hours. In a residential situation, for example, the home's HVAC system can generally warm or cool the interior of the home faster than the outdoor conditions change. On a sunny day, the outdoor temperature may vary from a daily low temperature to the high temperature for the day over a period of perhaps ten to fourteen hours. The home's air conditioning, however, can cool the home to a desired temperature in a much shorter period of time, as is illustrated in FIG. 1.

In some instances, the outdoor conditions and the corresponding indoor conditions within the home may be considered on a macro scale. The comfort level perceived by an individual, however, may vary on a micro scale. Even if the conditions within the home are fairly static, an individual's comfort level may change. For example, an individual may feel cold when first climbing out of a warm bed in the morning. The individual may feel warm once dressed after taking a hot shower somewhat later that same morning. In general, an individual who is currently sedentary may feel cooler than an individual who is moving around. An individual who is exercising may feel warmer than an individual who is doing housework. The individual doing housework may feel warmer than an individual who is watching television. These distinctions may apply to the perceived comfort level of each of a plurality of individuals within the home. These distinctions may also apply to a particular individual as they move from room to room within the home, and/or as their activity level changes during the day.

Figure 2:
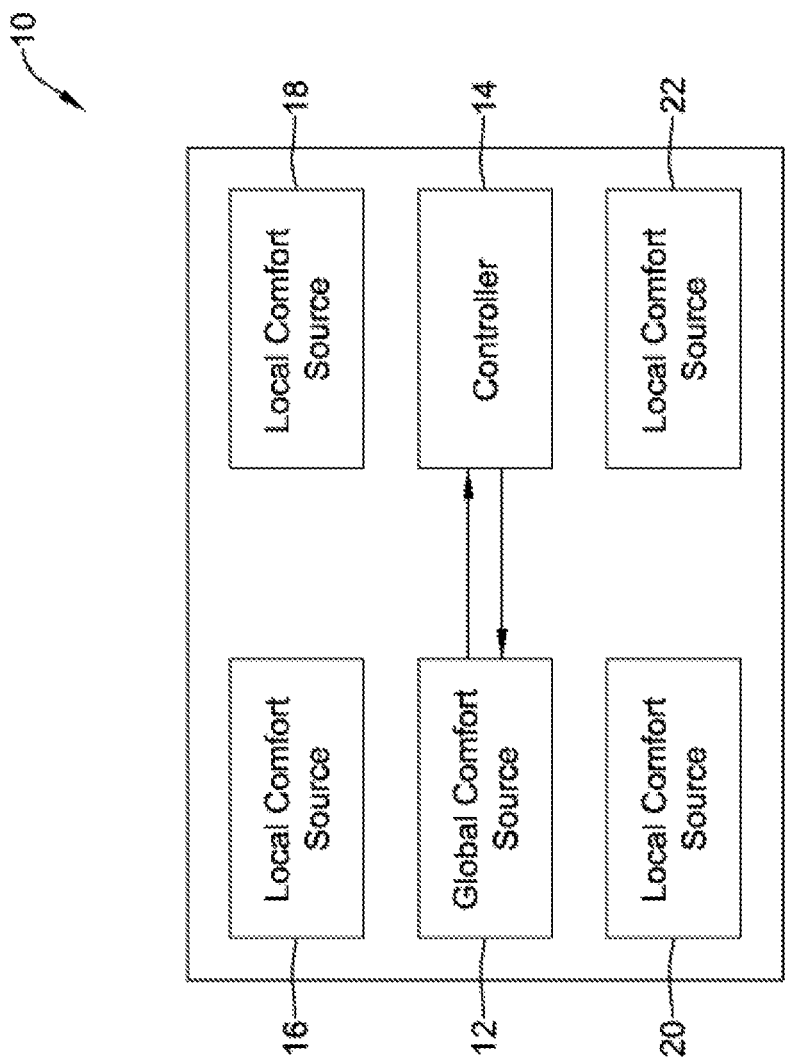
FIG. 2 is a highly schematic illustration of a home in accordance with an illustrative embodiment of the present disclosure.

FIG. 2 is a highly schematic illustration of a home 10. The home 10 includes a global comfort source 12, such as an HVAC system including one or more of a heating source, a cooling source, a ventilation source and a humidification source. In some cases, the global comfort source 12 may be operably coupled to a controller 14 that monitors conditions within the home 10 and operates the global comfort source 12 accordingly. In some embodiments, the controller 14 may be a programmable HVAC controller that operates in accordance with a preprogrammed schedule that affords energy savings by allowing the home 10 to be at a less comfortable temperature, for example, when the home 10 is not expected to be occupied, and/or when the occupants are expected to be sleeping. In some embodiments, the controller 14 may be an HVAC controller that is configured to determine when the home 10 is occupied or not occupied, and adjusts comfort levels accordingly. In some cases, the controller 14 may permit the use of one touch buttons that an individual can use to customize comfort levels.

In some instances, the home 10 may include a number of local comfort sources. As illustrated, the home 10 may include a local comfort source 16, a local comfort source 18, a local comfort source 20 and a local comfort source 22. It will be appreciated that in many cases, a home 10 may have a larger number of local comfort sources, and may in fact have one or more local comfort sources in most rooms. In some cases, a home 10 may have fewer than four local comfort sources. Each of the local comfort sources 16, 18, 20 and 22 may provide a source of warmth or a source of cooling. Local comfort sources of warmth may include but are not limited to a local HVAC system vent, damper or register, a portable space heater, a gas or electric fireplace, an electric blanket and the like. Local comfort sources of cooling may include but are not limited to a window or through wall air conditioner, a local HVAC system vent, damper or register, a ceiling fan, a free-standing fan, an open window, window shades, and the like. In FIG. 2, there is no central control to tie these disparate elements together.

Figure 3:
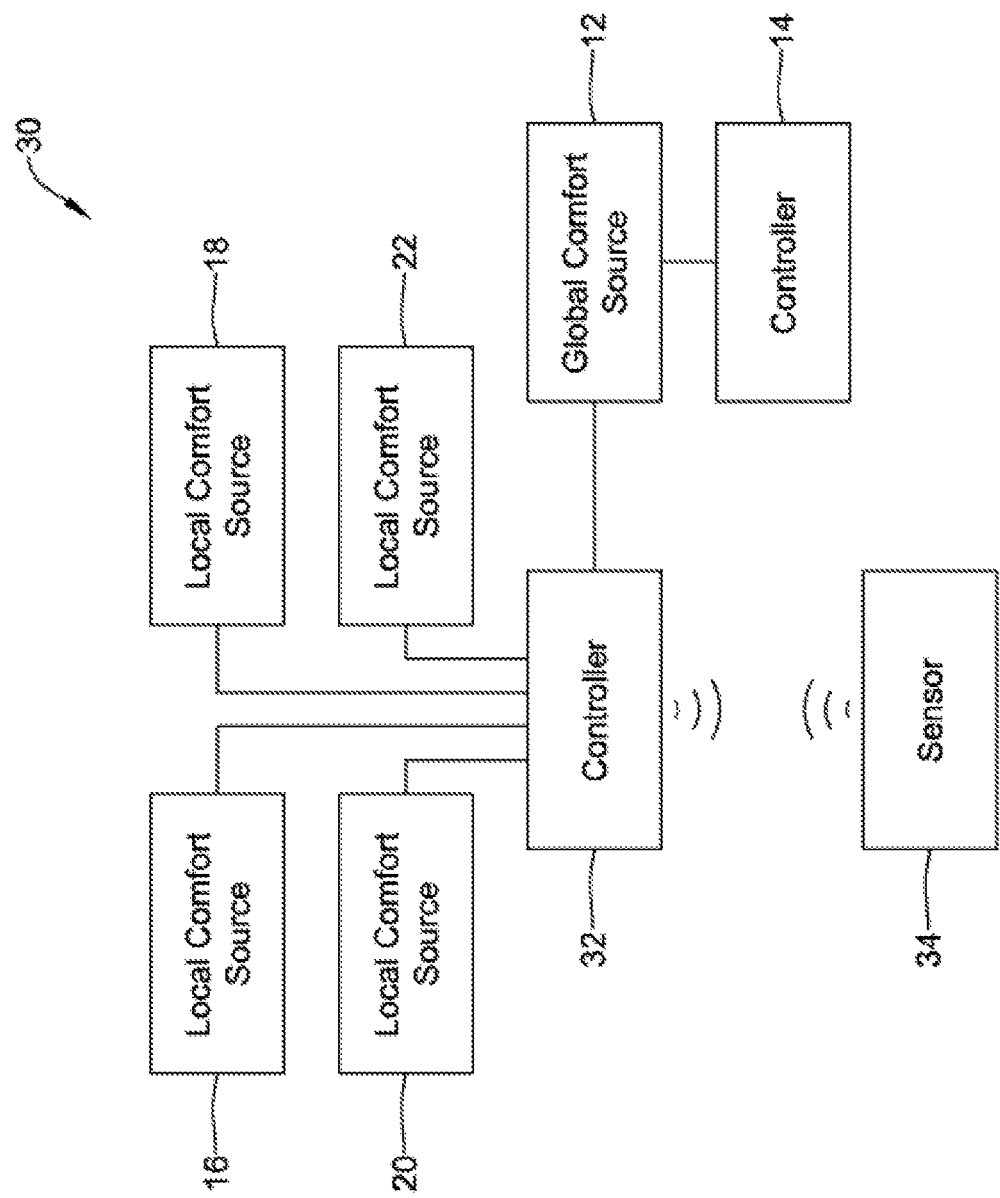
FIG. 3 is a schematic illustration of a comfort system in accordance with an illustrative embodiment of the present disclosure.

FIG. 3 provides a schematic illustration of a comfort system 30 in which a comfort controller 32 is operably coupled to the global comfort system 12 and to each of the local comfort sources 16, 18, 20 and 22. The global comfort system 12 may include its own controller 14, as also discussed with respect to FIG. 1. In some embodiments, at least some of the local comfort sources 16, 18, 20 and 22 are hard-wired to the comfort controller 32. In instances, at least some of the local comfort sources 16, 18, 20 and 22 communicate via a wireless communications protocol (e.g. Wifi, Bluetooth, Zigbee) with the comfort controller 32. In some cases, at least some of the local comfort sources 16, 18, 20 and 22 communicate via a wireless communications protocol to an access point and out to a remote web-service, which may allow the user to communicate and/or control the local comfort sources 16, 18, 20 and 22 with a smartphone, tablet, laptop or desktop computer. In some cases, the remote web-service of the local comfort sources 16, 18, 20 and 22 may communicate with a remote web-service of the global comfort system 12, and may allow the global comfort system 12 to retrieve data from the local comfort sources 16, 18, 20 and 22 and/or control the operation of the local comfort sources 16, 18, 20 and 22.

The illustrative comfort system 30 includes a sensor 34. While a single sensor 34 is shown, it will be appreciated that in some instances the comfort system 30 may include any number and any type of sensor 34. In some embodiments, for example, each room or distinct space may have its own temperature sensor, thereby providing a sort of room-by-room zone system. In some instances, the sensor 34 may be a wearable sensor that is worn by an individual. In some cases, this provides an advantage in that the sensor 34 is always proximate the individual, and is able to sense an indication of the wearer's comfort level.

If wearable, the sensor 34 may be configured to sense any number of parameters. In some cases, the sensor 34 may be a temperature sensor and may be configured to provide an indication of air temperature near the wearer to the comfort controller 32. In some cases, the sensor 34 may be configured to measure and report a parameter related to the individual himself or herself Illustrative but non-limiting examples include a sensor that measures heart rate, a sensor that measures blood pressure, a sensor that measures respiration rate, a sensor that measures skin temperature, a sensor that measures blood oxygen, a sensor that measures an activity level (accelerometer), a sensor that measures posture (laying down, sitting up, walking) (accelerometer), and/or a sensor that measures skin conductivity, which may be an indication of whether the wearer is perspiring and if so how much. In some cases, the sensor 34 may be a pedometer, and may provide an indication of how many steps the individual is taking. Alternatively, or in addition, sensor 34 may sense ambient conditions such as ambient temperature, ambient humidity, light level, solar energy level, air flow, carbon dioxide level, pollen level, and/or any other suitable parameter.

It will be appreciated that indications of heart rate, blood pressure, respiration, skin temperature and so on may provide the comfort controller 32 with an indication of the individual's physical activity level. If they are exerting themselves, the comfort controller 32 may, for example, instruct the global comfort source 12 to operate at a lower temperature, or to increase a ventilation rate in the building. The comfort controller 32 may, instead or in addition, instruct one or more of the local comfort sources 16, 18, 20 and 22 to activate and provide localized cooling, such as by activating a room air conditioner, turning up a ceiling fan, turning on a freestanding fan, and the like. In some cases, the response by the comfort system 30 to an indication of relative discomfort felt by the individual wearing the sensor 34 may be tiered, i.e., a first level of response for a relatively minor level of discomfort, a second, greater level of response for a greater level of discomfort, and so on.

Figure 4:
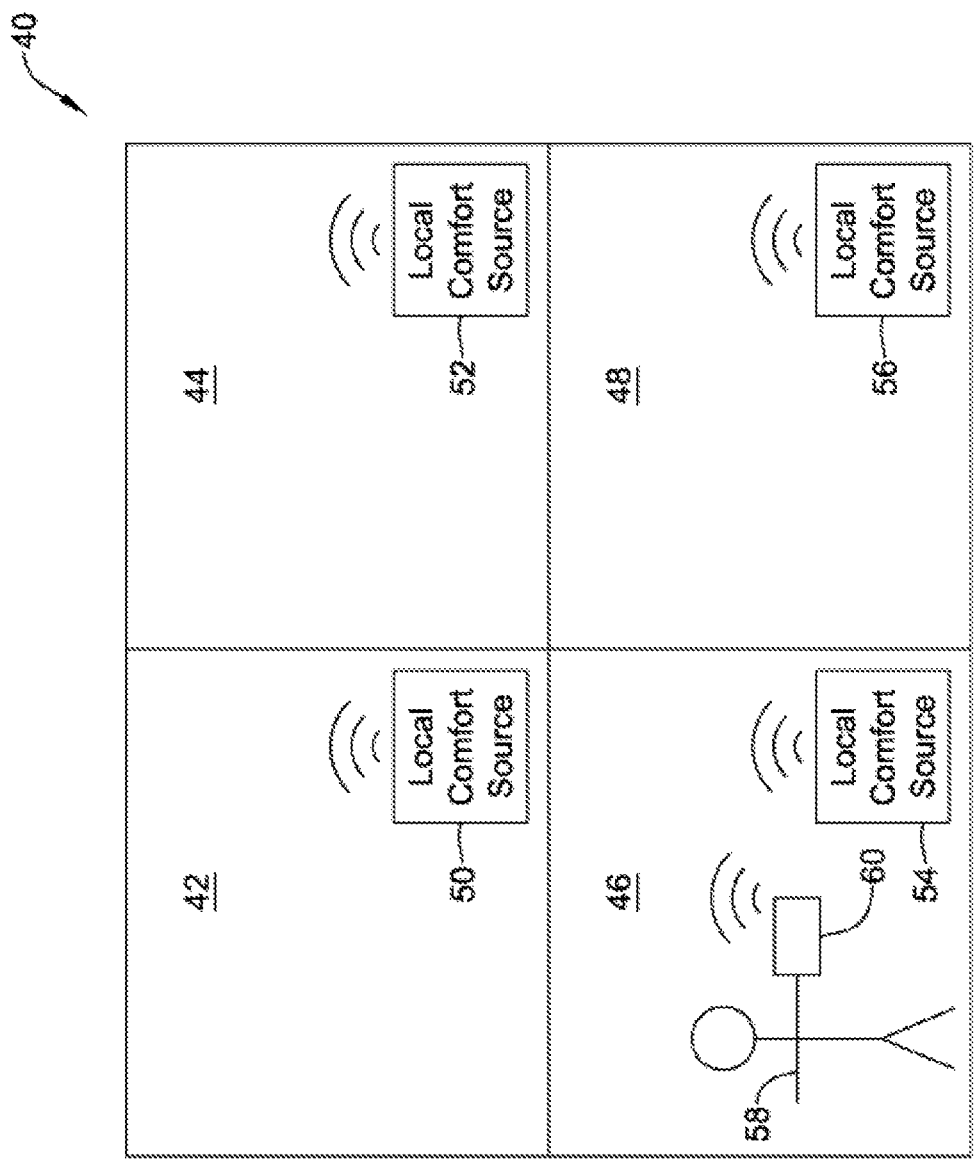
FIG. 4 is a schematic illustration of a building space in accordance with an illustrative embodiment of the present disclosure.

FIG. 4 provides a schematic illustration of a building space 40, schematically divided into a space 42, a space 44, a space 46 and a space 48. In some instances, each of the spaces 42, 44, 46 and 48 may represent individual rooms in the building. In some cases, each of the spaces 42, 44, 46 and 48 may represent separate floors of a building, or other subsets of the building space 40. As illustrated, the space 42 includes a local comfort source 50, the space 44 includes a local comfort source 52, the space 46 includes a local comfort source 54 and the space 48 includes a local comfort source 56. While each space 42, 44, 46 and 48 is shown having a single local comfort source 50, 52, 54 and 56, respectively, in some cases one or more of the spaces may have more than one local comfort source, or no local comfort source.

As illustrated, an individual 58 is physically within space 46. The individual 58 includes a wearable sensor 60 that is configured to measure or otherwise detect an indication of a comfort level of the individual 58, including but not limited to heart rate, blood pressure, respiration rate, temperature and the like. In some instances, the wearable sensor 60 may not actually be wearable, such as a wrist band, but may fit into a pocket or be worn on a lanyard. In some cases, the wearable sensor 60 may not actually directly sense or otherwise measure any indication of a comfort level of the individual 58 (an implicit action), but instead may be configured to permit the individual 58 to inform the wearable sensor 60 of his or her current comfort level (an explicit action). The individual 58 could, for example, tap an up button or a down button, to indicate whether they wish to be warmer or cooler. The wearable sensor 60 may include voice recognition circuitry such that the individual 58 may simply state their current comfort level, or state a desired change in comfort level (e.g. "I am cold", or "make it warmer by 2 degrees", etc.)

Regardless of how the wearable sensor 60 determines or is instructed regarding a current comfort level of the individual 58, the wearable sensor 60 is configured to communicate with a comfort source. In FIG. 4, the wearable sensor 60 may be configured to communicate with a short range wireless communications protocol such as Bluetooth. When so provided, the local comfort sources 50, 52, 54 and 56 may also be equipped to communicate with the short range wireless communications protocol such as Bluetooth. In some cases, Bluetooth and other similar communication protocols have a relatively limited range of about 60 feet or less. As a result, the wearable sensor 60 may only communicate with those local comfort source that are in the same space as the individual 58 (and hence the wearable sensor 60). As illustrated, the individual 58 is in the space 46, and thus the wearable sensor 60 may communicate wirelessly with the local comfort source 54. If the individual 58 moves into a different space, say for example the space 42, then the wearable sensor 60 may communicate with the local comfort source 50.

Figure 5:
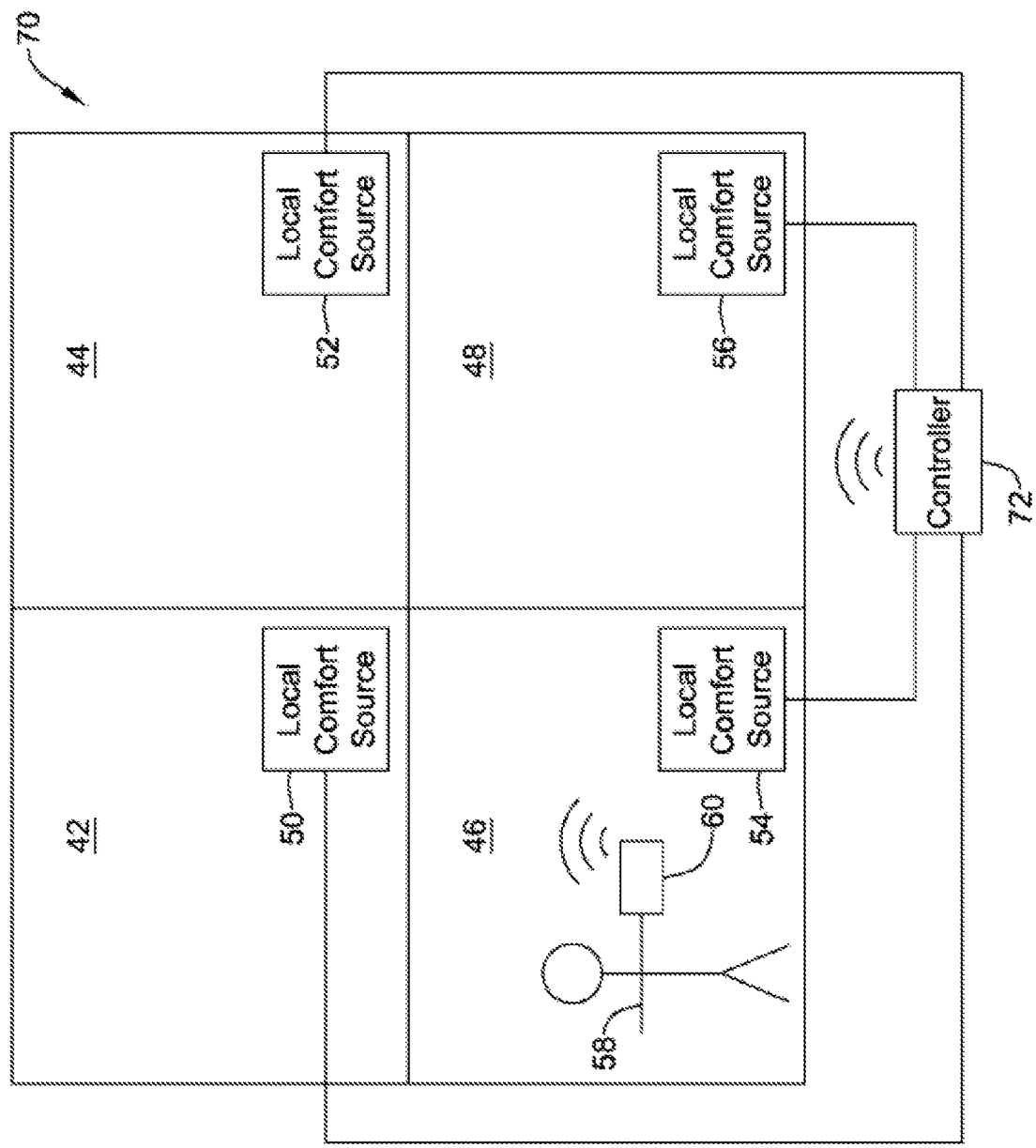
FIG. 5 is a schematic illustration of a building space in accordance with an illustrative embodiment of the present disclosure.

In the embodiment of FIG. 4, the wearable sensor 60 communicates directly with whichever local comfort source(s) are in communications range. In some cases, the wearable sensor 60 may instead communicate wirelessly with a controller 72 that itself sends appropriate instructions to the local comfort sources 50, 52, 54 and 56. FIG. 5 provides a schematic illustration of a building space 70 that, as before, includes the space 42 and local comfort source 50, the space 44 and local comfort source 52, the space 46 and local comfort source 54 and the space 48 and local comfort source 56. In this embodiment, the wearable sensor 60, carried or worn by the individual 58, does not communicate directly with the local comfort sources 50, 52, 54 and 56, but instead communicates wirelessly with a comfort controller 72.

In some cases, the wearable sensor 60 may communicate via a wireless communications protocol to an access point and then out to a remote web-service, which may allow the user to communicate, view and/or control the wearable sensor 60 with a smartphone, tablet, laptop or desktop computer. In some cases, the remote web-service of the wearable sensor 60 may communicate with a remote web-service of the global comfort system 12, and may allow the global comfort system 12 to retrieve data from the wearable sensor 60 and/or control the operation of the wearable sensor 60.

The comfort controller 72, upon receiving an indication of a current comfort level of the individual 58, or upon receiving instructions from the wearable sensor 60, may communicate with one or more of the local comfort sources 50, 52, 54, 56. The comfort controller 72 may communicate wirelessly with the local comfort sources 50, 52, 54, 56. In some instances, the comfort controller may be hard-wired to one or more of the local comfort sources 50, 52, 54, 56. In some cases, there is no direct communication with the local comfort sources 50, 52, 54, 56, but instead the comfort controller 72 may control an outlet into which the local comfort sources 50, 52, 54, 56 are plugged into. This may be useful, for example, if the local comfort sources 50, 52, 54, 56 lack intelligence, such as a simple electric blanket, electric fan and the like.

A home or other building may include a single comfort controller 72. In some cases, such as if the home or building is larger than can be reached via the short range communication protocol by which the comfort controller 72 communicates, the building may include several comfort controllers 72 that may be spaced apart within the building. Each comfort controller 72 may regulate operation of local comfort sources within an assigned portion of the building. In some cases, each of the comfort controllers 72 may be in communication with the other comfort controllers 72, and thus any particular comfort controller 72 may instruct any desired local comfort source.

Figure 6:
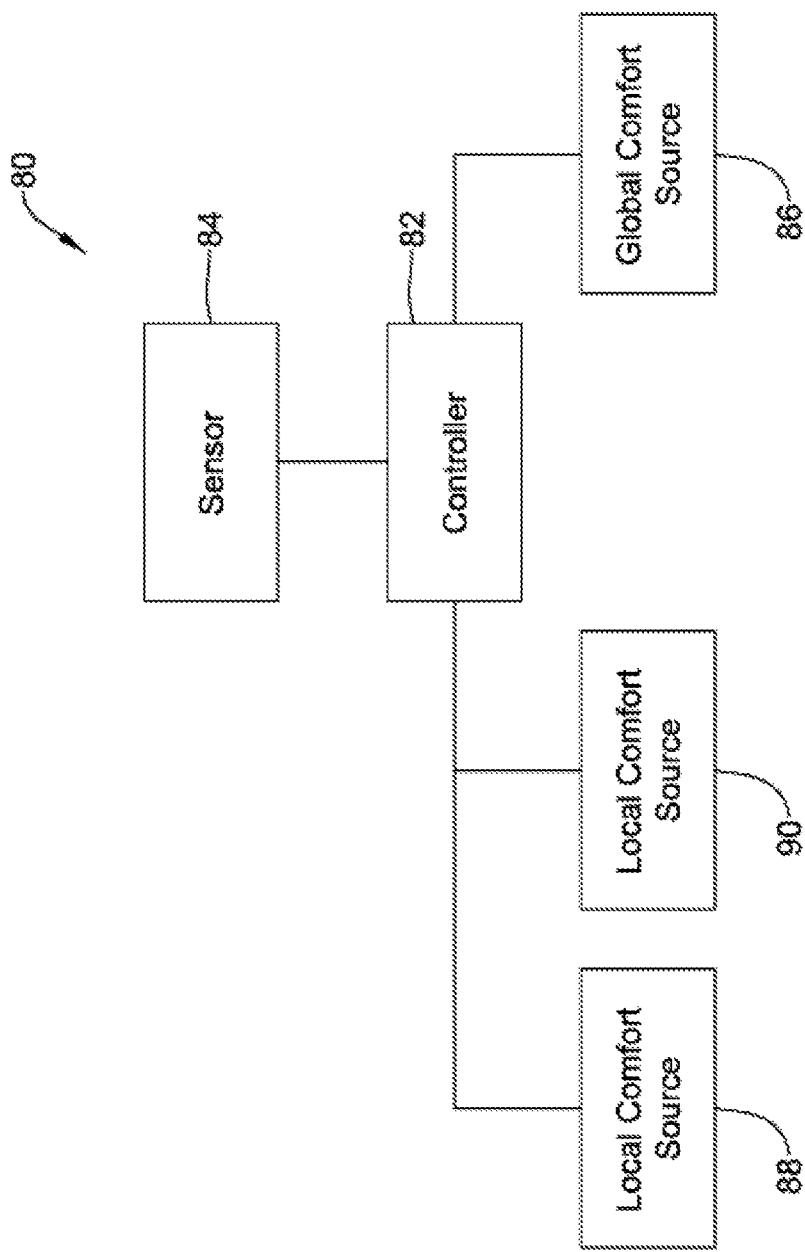
FIG. 6 is a schematic illustration of a control system in accordance with an illustrative embodiment of the present disclosure.

In some cases, a combination of a global comfort system and local comfort systems may be used to provide an individual 58 (FIGS. 4 and 5) with a desired comfort level. FIG. 6 provides a schematic illustration of a system 80 that includes a comfort controller 82. The comfort controller 82 is configured to communicate, either wired or wirelessly, with a sensor 84 that may be a room or space sensor, a wearable sensor, or the like. The sensor 84, which may be a single sensor or may represent two or more distinct sensors, provides the comfort controller 82 with an indication of a current comfort level of an individual (such as the individual 58). In turn, the comfort controller 82 instructs a global comfort system 86 and/or one or more of a local comfort system 88 and a local comfort system 90 to operate in order to improve a current comfort level of the individual 58. While two local comfort systems 88, 90 are illustrated, it will be appreciated that this is illustrative only.

Figure 7:
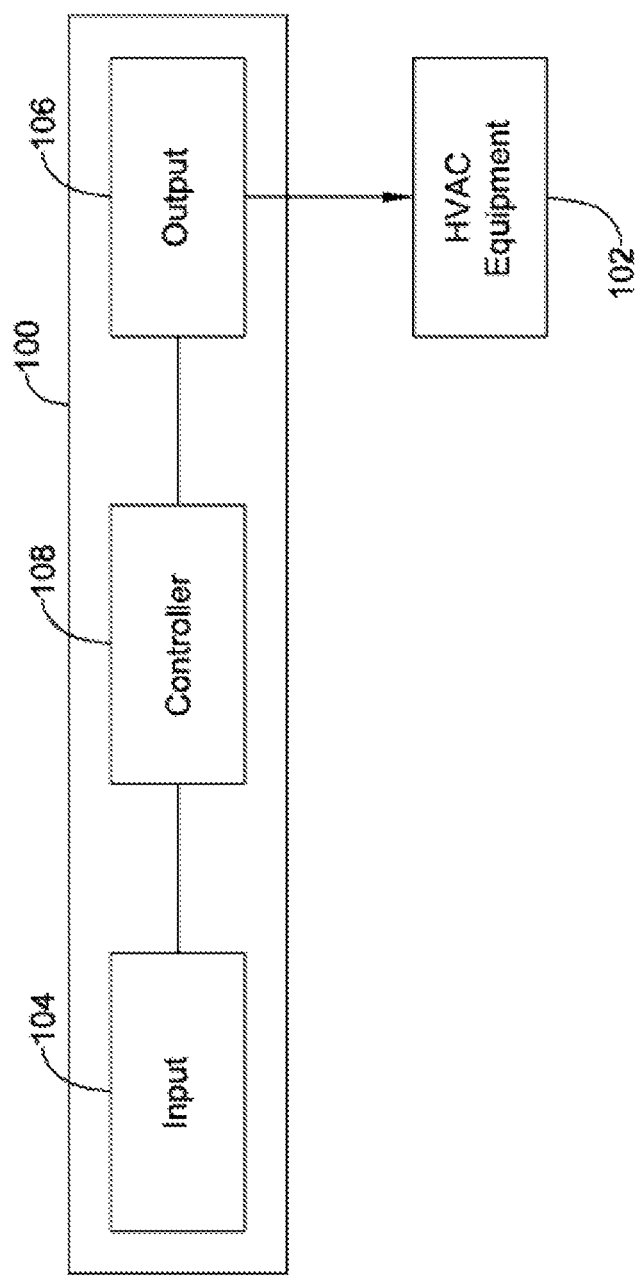
FIG. 7 is a schematic illustration of an HVAC controller in accordance with an illustrative embodiment of the present disclosure.

FIG. 7 is a schematic illustration of an HVAC controller 100 that may be configured to control HVAC equipment 102. The HVAC controller 100 includes an input 104 for receiving a measure of the level of physical activity of an individual and/or other local or global parameters within a building, an output 106 and a controller 108 that is coupled to the input 104 and the output 106. In some cases, the controller 108 is configured to change a setpoint for an environmental parameter based, at least in part, on the measure of the level of physical activity and/or other local or global parameters received via the input, and to send one or more control signals to the output 106 for controlling the HVAC equipment 102 of the building to maintain the environmental parameter within the building in accordance with the setpoint.

In some embodiments, the measure of the level of physical activity is a value that is one of three or more available values, such as but not limited to low activity, medium activity and high activity. In some instances, the measure of the level of physical activity is based, at least in part, on a measure of perspiration of the individual within the building. In some instances, the measure of the level of physical activity is based, at least in part, on a measure of heart rate of the individual within the building. In some cases, the measure of the level of physical activity is based, at least in part, on a measure of skin temperature of the individual within the building. In some embodiments, the measure of the level of physical activity is based, at least in part, on a measure of movement (e.g. activity level) of the individual within the building. In some cases, the controller 108 is configured to change the setpoint by a setpoint offset, wherein the setpoint offset is based, at least in part, on the measure of the level of physical activity received via the input. In some cases, the setpoint is part of a programmed schedule. In some instances, the setpoint is a comfort setpoint or a temperature setpoint.

Figure 8:
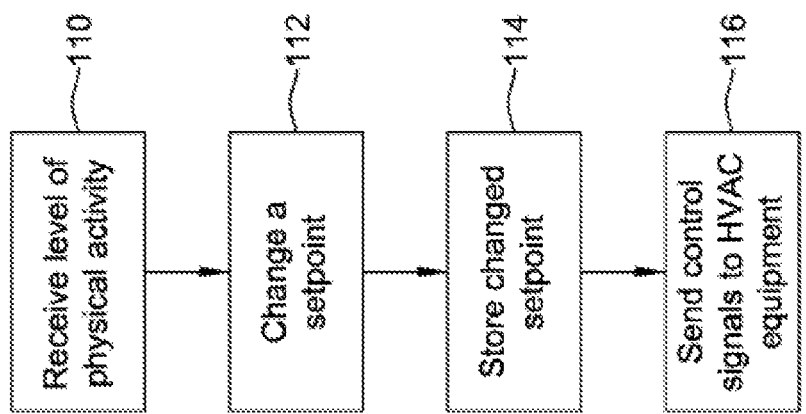
FIG. 8 is a flow diagram illustrating a method in accordance with an illustrative embodiment of the present disclosure.

FIG. 8 provides a flow diagram illustrating a method that may be carried out. A level of physical activity of an individual within a building may be received, as generally indicated at block 110. A setpoint for an environmental parameter may be changed, based at least in part on the received level of physical activity, as generally seen at block 112. As shown at block 114, the changed setpoint may be stored in physical memory, as generally indicated at block 116. As shown at block 118, one or more control signals may be sent to the HVAC equipment of the building to maintain the environmental parameter within the building in accordance with the changed setpoint.

In some cases, the level of physical activity is one of three or more available levels of physical activity. In some instances, the level of physical activity is based, at least in part, on a measure of perspiration of the individual within the building. In some instances, the level of physical activity is based, at least in part, on a measure of heart rate of the individual within the building. In some cases, the level of physical activity is based, at least in part, on a measure of temperature of the individual within the building. In some instances, the level of physical activity is based, at least in part, on a measure of movement (e.g. activity level) of the individual within the building. In some cases, control signals may also be sent to one or more local comfort sources, if desired.

Figure 9:
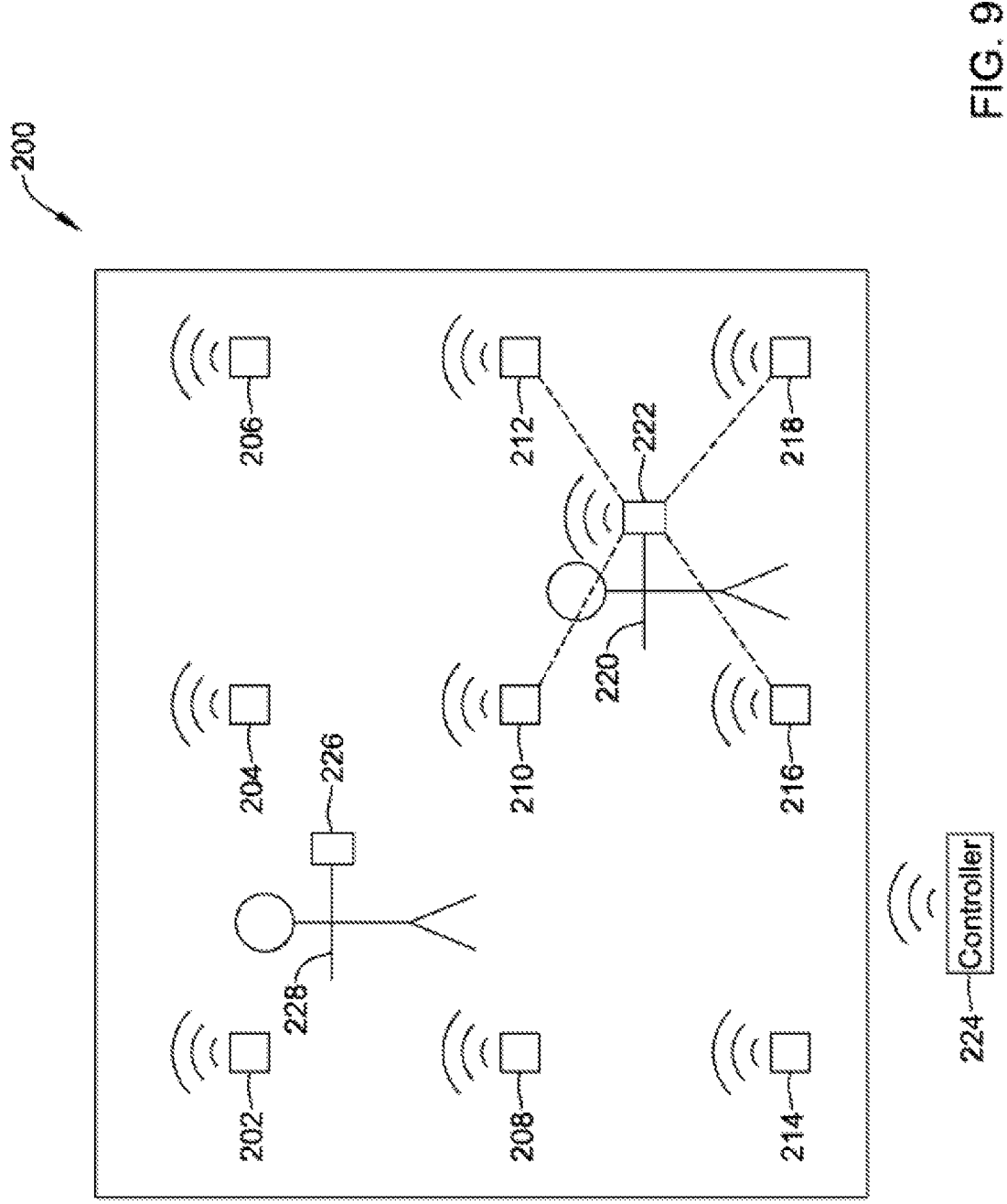
FIG. 9 is a schematic illustration of a building space in accordance with an illustrative embodiment of the present disclosure.

FIG. 9 provides a schematic illustration of a building space 200. It will be appreciated that the building space 200 may represent a portion of a home or other building, or the building space 200 may represent an entire home or other building. The building space 200 may encompass a single room, or a plurality of rooms. For simplicity, no interior walls are shown in FIG. 9. The building space 200 includes a number of local comfort sources. As illustrated, there are a total of nine local comfort sources labeled as 202, 204, 206, 208, 210, 212, 214, 216 and 218, but in other embodiments there may be fewer than nine local comfort sources, or there may be ten or more local comfort sources. Each of these local comfort sources 202, 204, 206, 208, 210, 212, 214, 216 and 218 may be considered as generally representing one or more of the local comfort sources described and shown in any of the other drawings. In some cases, each of these local comfort sources 202, 204, 206, 208, 210, 212, 214, 216 and 218 include the ability to communicate via a short range communications protocol such as Bluetooth, WiFi, or the like, and thus may collectively be considered as forming a network or web that can be used to localize an individual.

As shown in FIG. 9, an individual 220 includes a sensor 222. The sensor 222 may be a wearable sensor, or may be carried by the individual 220. As the individual moves about within the building space 200, it will be appreciated that the relative distances between the sensor 222 (and hence the individual 220) and the local comfort sources 202, 204, 206, 208, 210, 212, 214, 216 and 218 will vary. A controller 224, which may be in wired or wireless communication with the local comfort sources 202, 204, 206, 208, 210, 212, 214, 216 and 218, and/or other comfort controllers, can utilize relative signal strength between the sensor 222 and one or more of the local comfort sources 202, 204, 206, 208, 210, 212, 214, 216 and 218 to triangulate the position of the individual 220. By knowing the location of the individual 220, the controller 224 may properly instruct the appropriate local comfort source out of the local comfort sources 202, 204, 206, 208, 210, 212, 214, 216 and 218 to provide heating or cooling, as appropriate, based upon the intrinsic or extrinsic commands from the individual 220.

In some cases, there may be more than one individual within the building space 200. As illustrated, there is a second individual 228 wearing or otherwise carrying a sensor 226. By determining the location of each individual, such as the individual 220 and the individual 228, the controller 224 may instruct the appropriate local comfort source out of the local comfort sources 202, 204, 206, 208, 210, 212, 214, 216 and 218 to operate in accordance with any intrinsic or extrinsic commands from the individual 220 and/or the individual 228.

Various people within the building space, such as the individual 220 and the individual 228, may have preferences as to their environment. For example, the individual 220 may prefer a relatively warmer temperature of 72 degrees Fahrenheit (F.) while the individual 228 may prefer a relatively cooler temperature of 68 degrees F. When the individuals 220 and 228 are in separate locations within the building space 200, it is relatively simple to provide each with their desired comfort level. If these individuals 220 and 228 are in the same local space, say both are in the same room, it may be more difficult to satisfy both people. In some embodiments, the controller 224 may simply provide an averaged temperature. Thus, if both individuals 220, 228 are located in the same room, the controller 224 may instruct one of the local comfort sources 202, 204, 206, 208, 210, 212, 214, 216 and 218 and/or a global comfort source to provide a room temperature of 70 degrees F. In some cases, depending on the location and identity of any local comfort sources, it may be possible, for example, to operate the global comfort source to provide the room with an air temperature of 68 degrees F. while a local comfort source such as an electric blanket may be activated to provide the individual 220 with a relatively warmer comfort feel.

In some cases, the controller 224 may be programmed with a hierarchy. For example, if the individual 220 is an adult, and the individual 228 is a child, the controller 224 may be programmed to give priority to the individual 220 (the adult). In another example, if both are adults, and the individual 220 is the father and the individual 228 is the mother, the controller 224 may be programmed to defer to one over the other. These are preferences that a building owner may program into the controller 224, or into the sensors 222, 226, for example. It will be appreciated that the controller 224 may represent or be manifested within one or more of the comfort controller 32 (FIG. 3), the comfort controller 72 (FIG. 5) and/or the comfort controller 82 (FIG. 6).

Figure 10:
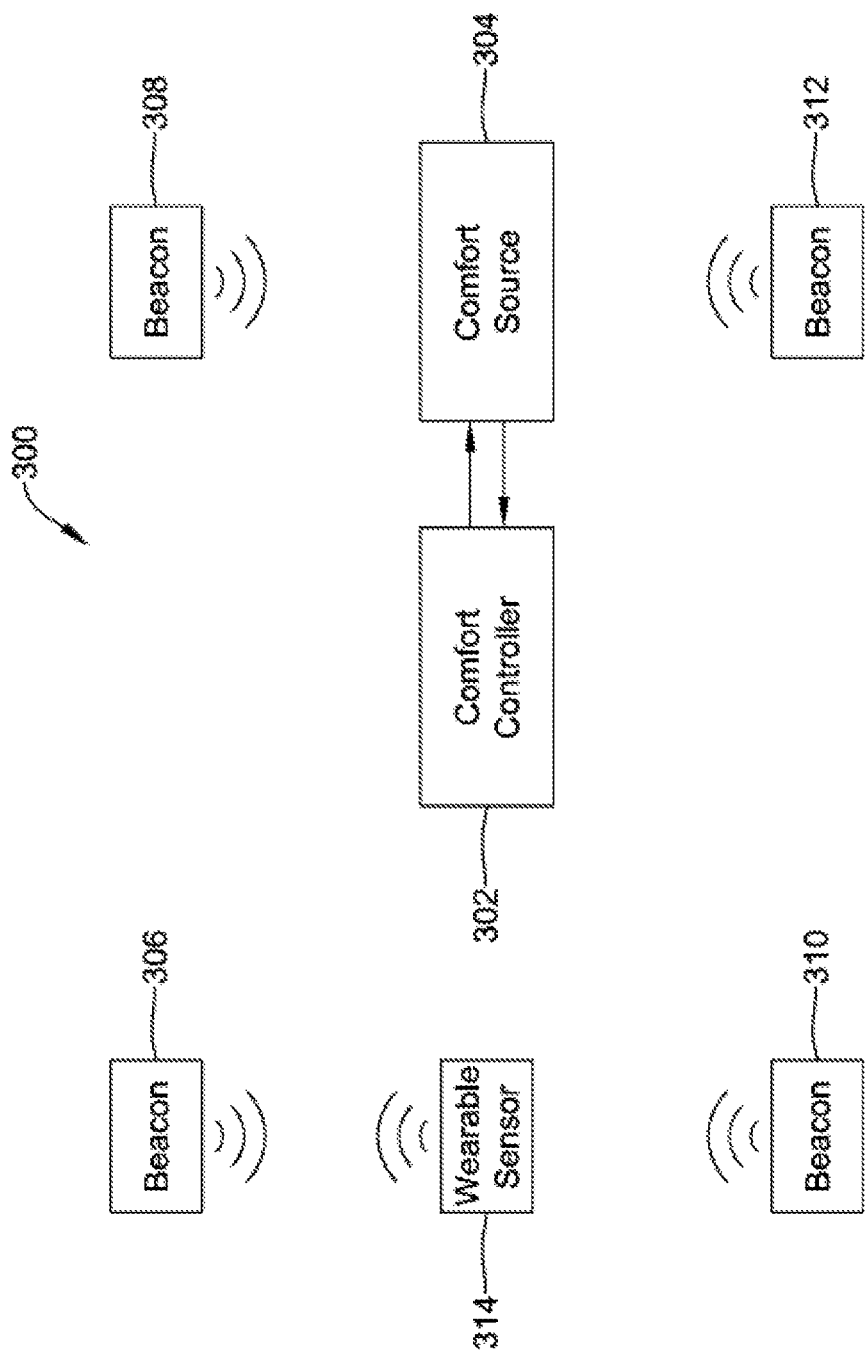
FIG. 10 is a schematic illustration of a building space comfort system in accordance with an illustrative embodiment of the present disclosure.

FIG. 10 is a schematic illustration of an illustrative building space comfort system 300. In some cases, the building space comfort system 300 may be considered as being representative of the comfort system 30 (FIG. 3). In some instances, the building space comfort system 300 may be considered as adding additional functionality to the comfort system 30. In some cases, the building space comfort system 300 may be considered as being a standalone system distinct from the comfort system 30. In some cases, as illustrated, the building space comfort system 300 may include a comfort controller 302 and a comfort source 304. It will be appreciated that in some cases, the comfort controller 302 may be considered as being representative of the HVAC controller 14 (FIG. 2) and/or any of the comfort controller 32 (FIG. 3), the comfort controller 72 (FIG. 5) or the comfort controller 82 (FIG. 6). In some instances, the comfort controller 302 may be considered as providing additional functionality to any of the aforementioned comfort controllers 32, 72, 82. In some cases, the comfort controller 302 may be distinct from any of the comfort controllers 32, 72, 82. The comfort source 304 may include a global comfort source such as the global comfort source 12 (FIG. 2) or the global comfort source 86 (FIG. 6) and/or one or more local comfort sources such as the local comfort sources 16, 18, 22, 24 (FIGS. 2 and 3), or the local comfort sources 50, 52, 54, 56 (FIGS. 4 and 5), or the local comfort sources 88 and 90 (FIG. 6). In some cases, the comfort source 304 may be distinct from any of these previously referenced global and/or local comfort sources.

In the example shown, the building space comfort system 300 may include a number of wireless beacons 306, 308, 310, 312 that may be distributed throughout a building space in which the building space comfort system 300 is deployed. It will be appreciated that while a total of four wireless beacons 306, 308, 310, 312 are illustrated, in many cases the building space comfort system 300 will have a larger or smaller number of wireless beacons. In some cases, there may be at least one wireless beacon in each room, for example. Some larger spaces may include several wireless beacons. In some cases, one or more of the wireless beacons 306, 308, 310, 312 may be standalone wireless beacons. In some instances, at least some of the wireless beacons 306, 308, 310, 312 may instead be deployed as part of one or more local comfort sources. For example, as discussed with respect to FIG. 9, one or more of the local comfort sources 202, 204, 206, 208, 210, 212, 214, 216 and 218 may be in wireless communication with a comfort controller (such as the comfort controller 302). A wearable sensor 314, which may be worn or otherwise carried by an individual, may move about the space with the individual. As the individual moves about within the building space, it will be appreciated that the relative distances between the wearable sensor 314 and one or more of the wireless beacons 306, 308, 310, 312 will change. As a result, and in some cases, a relative signal strength may be used to triangulate or otherwise determine a position of the wearable sensor 314.

The comfort controller 302 is able to determine the current position of the wearable sensor 314. As will be appreciated, the wearable sensor 314 may also provide the comfort controller 302 with data representing a measure of comfort pertaining to the individual wearing or otherwise carrying the wearable sensor 314. A measure of comfort may include, for example, an actual air temperature, a feels like air temperature (e.g. air temperature, humidity level, and/or activity level), a perspiration level, a heart rate level, activity level, and/or the like. In some cases, the comfort controller 302 may be configured to accept data from the wearable sensor 314 pertaining to location and comfort over time, and thus can develop and maintain a two or more dimensional comfort map of the building space.

In one example, in a single level building, the comfort controller 302 may develop and maintain a two dimensional comfort map, with the two dimensions referencing relative position within an X-Y plane, or perhaps more coarsely by simply tracking comfort data for each room within the single level building. In a two story building, the comfort controller 302 may develop and maintain a three dimensional comfort map, with the three dimensions referencing relative position within an X-Y-Z coordinate system, or perhaps more coarsely by simply tracking comfort data for each room on the first floor, and for each room on the second floor. Such a comfort map may be tracked over time, adding an additional dimension to the comfort map.

The comfort controller 302 may utilize the two or more dimensional comfort map in a variety of ways. In some cases, the comfort controller 302 may utilize the information contained in the comfort map to gain a better understanding of the thermal properties of the building space and apply this understanding to improve comfort control within the building space. For example, the comfort controller 302 may determine, based on the comfort map, that certain portions of the building tend to run cooler than other portions. The comfort controller 302 may use this information to drive changes to how particular dampers are opened and closed over time to improve the comfort in the building space. In another example, the comfort controller 302 may determine, based on the comfort map, that certain portions of the building tend to be occupied at particular times of day, and that certain other portions of the building tend to be unoccupied at particular times of a day. The comfort controller 302 may use this information to, for example, more energy efficiently heat and cool the space by not heating or cooling empty spaces.

In some cases, the comfort controller 302 may use information from the comfort map to control the comfort source 304. For example, in some cases the comfort controller 302 may direct operation of a global comfort source in response to the comfort map. In some cases, the global comfort source may be a central HVAC system that is installed within the building space. In some instances, the comfort controller 302 may direct operation of a particular local comfort source. It will be appreciated that a local comfort source may, for example, be one or more of an HVAC system vent, damper or register, a gas fireplace, an electric fireplace, a space heater, an electric blanket, a ceiling fan, a floor fan, a table fan, or a window air conditioner.

Figure 11:
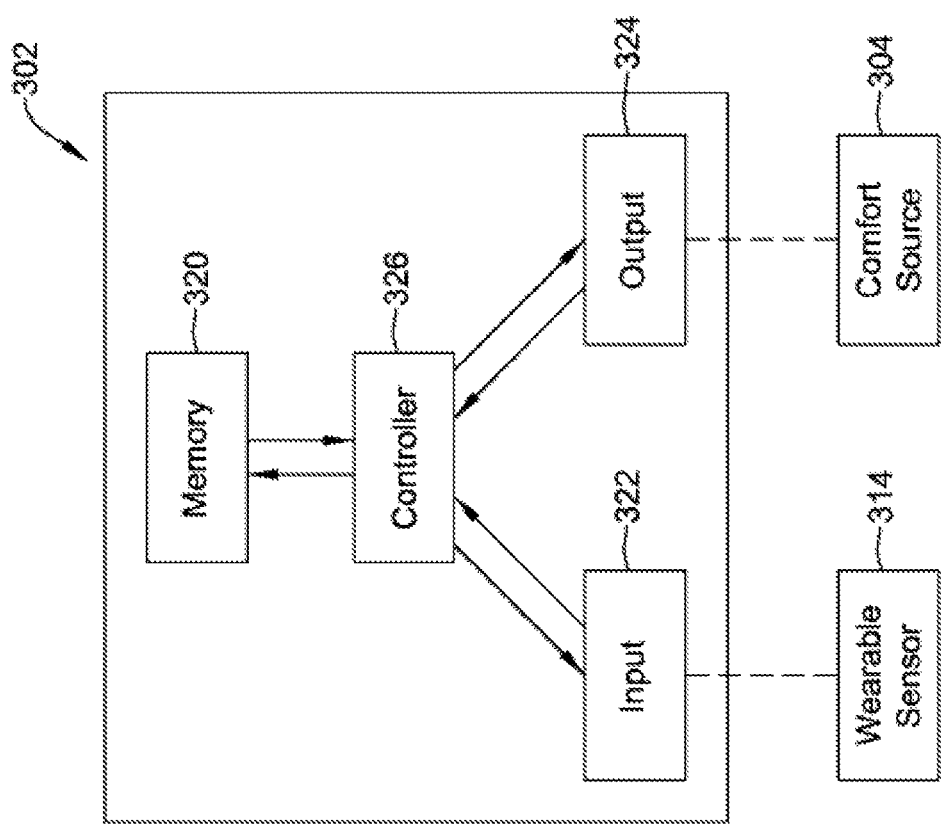
FIG. 11 is a schematic illustration of a building comfort controller such as may be employed within the building space comfort system of FIG. 10.

FIG. 11 is a schematic illustration of the illustrative comfort controller 302 of FIG. 10, providing further details regarding the structure and operation of the comfort controller 302. The illustrative comfort controller 302 includes a memory 320 for storing the two or more dimensional comfort map of the building space. An input 322 enables the comfort controller 302 to receive comfort data and location data from wearable sensors such as the wearable sensor 314. An output 324 enables the comfort controller 302 to send control instructions to one or more comfort sources such as the comfort source 304. A controller 326 is shown operably coupled to the memory 320, the input 322 and the output 324. In some cases, the controller 326 may be configured to accept a floor plan uploaded via the input 322 and to incorporate the floor plan into the two or more dimensional comfort map of the building space. In some cases, the controller 326 is configured to update the two or more dimensional comfort map of the building space over time using comfort data and location data received from the one or more wearable sensors 314 over time.

In some cases, the controller 326 is further configured to control the one or more comfort sources 304 based at least in part on the two or more dimensional comfort map of the building space. In some instances, the controller 326 is configured to control the one or more comfort sources 304 based at least in part on the two or more dimensional comfort map of the building space and a current location of one or more of the wearable sensors 314. When so provided, energy may not be wasted heating or cooling an unoccupied space, for example. In some cases, the one or more comfort sources 304 may include a controllable damper. In some instances, the one or more comfort sources 304 may include one or more localized comfort sources and one or more global comfort sources. In some cases, the one or more global comfort sources may include a central HVAC system installed within the building space, and the one or more localized comfort sources may include one or more of a gas fireplace, an electric fireplace, a space heater, an electric blanket, a ceiling fan, a floor fan, a table fan, or a window air conditioner. These are just examples.

Figure 12:
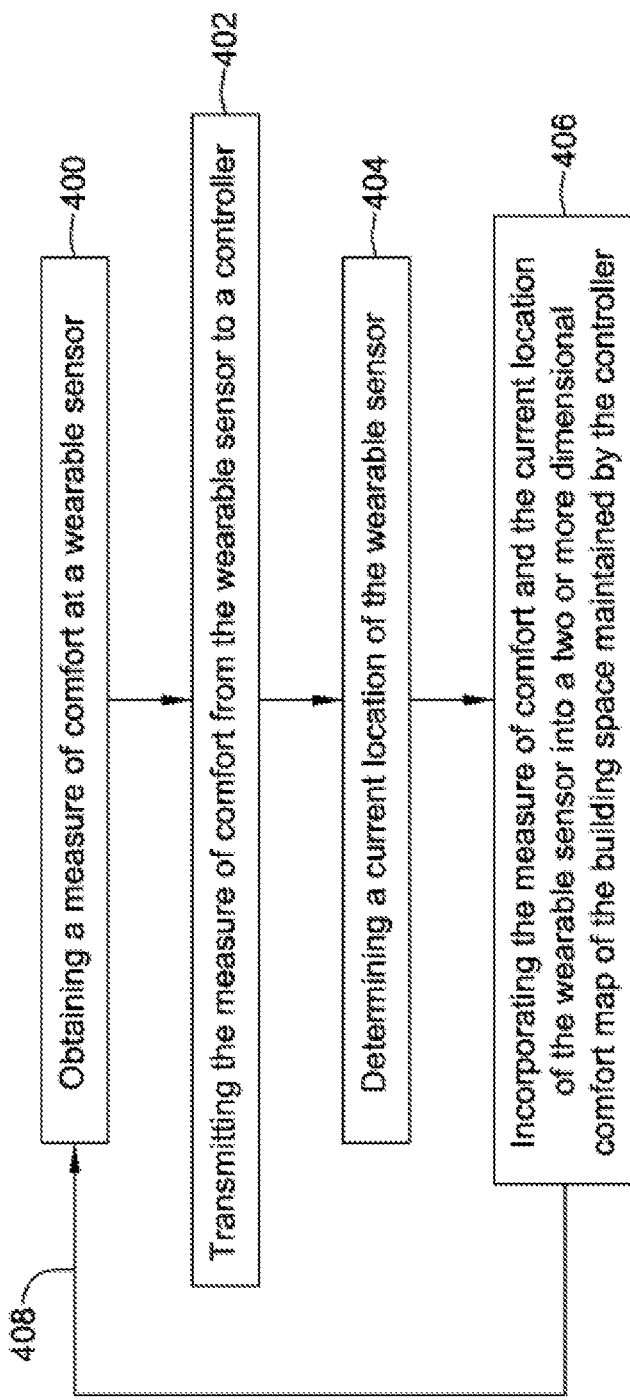
FIGS. 12 through 17 are flow diagrams showing illustrative methods in accordance with illustrative embodiments of the present disclosure.

FIGS. 12 through 17 are flow diagrams showing illustrative but non-limiting examples of methods that may be carried out. FIG. 12 shows a method of mapping comfort conditions within a building space, with one or more individuals having wearable sensors in the building space. A measure of comfort may be obtained at a wearable sensor such as the wearable sensor 314 (FIG. 10), as generally indicated at block 400. The measure of comfort may include, for example, an air temperature and/or a feels like temperature. At block 402, the measure of comfort may be transmitted from the wearable sensor to a controller such as the comfort controller 302 (FIG. 10). In some cases, the wearable sensor may be configured to communicate with the comfort controller via a wireless communications protocol (e.g. Wifi, Bluetooth, Zigbee).

A current location of the wearable sensor may be determined, as seen at block 404. In some cases, determining a current location of the wearable sensor includes triangulating between a plurality of wireless beacons. In some instances, at least some of the plurality of wireless beacons are disposed within localized comfort sources that are present in the building space, although this is not required. In some cases, at least some of the plurality of wireless beacons include wireless beacons separate from localized comfort sources distributed through the building space.

At block 406, the measure of comfort and the current location of the wearable sensor may be incorporated into a two or more dimensional comfort map of the building space maintained by the controller. These steps may be repeated over time, as indicated by line 408, as the one or more individuals having the wearable sensors move about the building space to populate the two or more dimensional comfort map over time.

Figure 13:
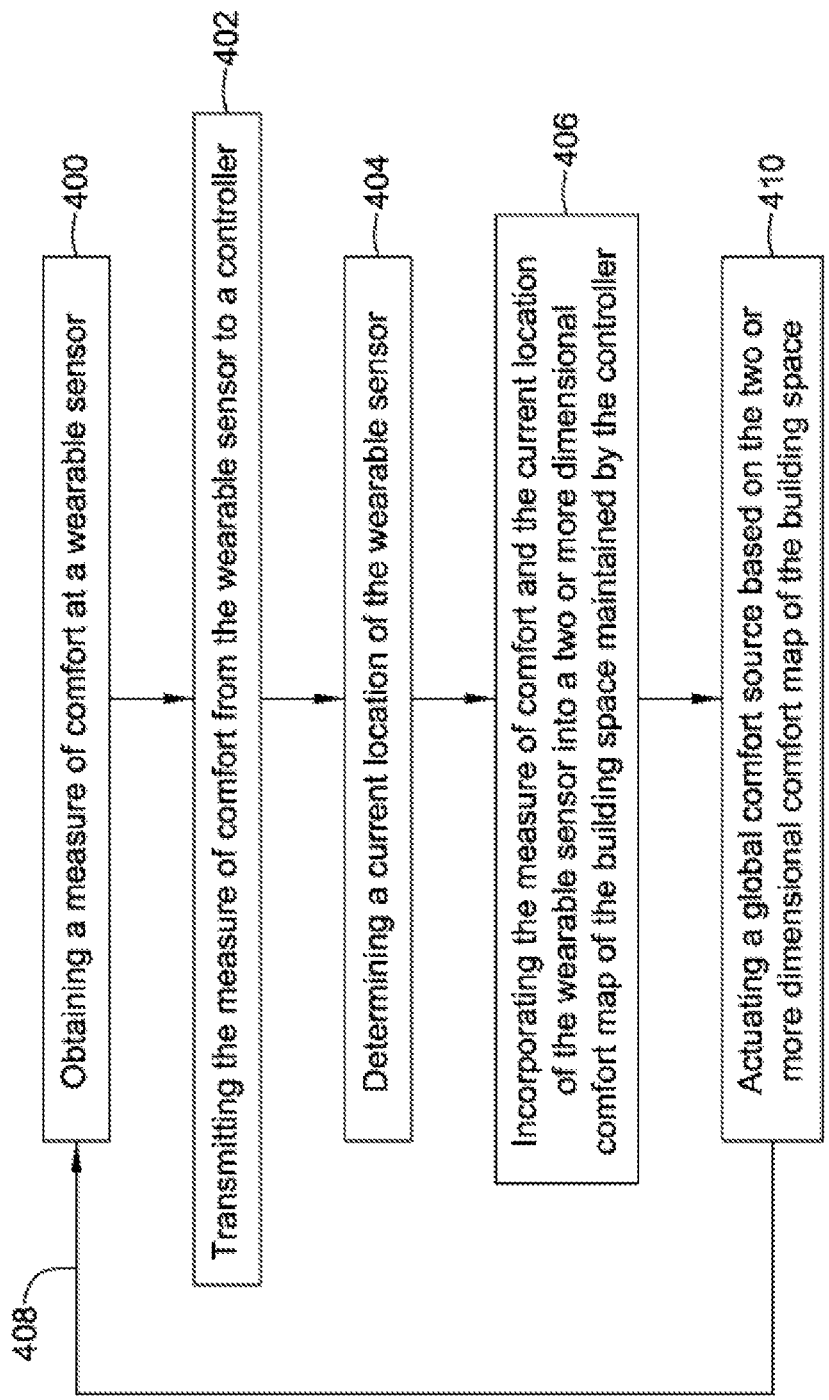

FIG. 13 shows another illustrative method of mapping comfort conditions within a building space, with one or more individuals having wearable sensors in the building space. A measure of comfort may be obtained at a wearable sensor such as the wearable sensor 314 (FIG. 10), as generally indicated at block 400. For example, the measure of comfort may be an air temperature and/or a feels like temperature. At block 402, the measure of comfort may be transmitted from the wearable sensor to a controller such as the comfort controller 302 (FIG. 10). In some cases, the wearable sensor may be configured to communicate with the comfort controller via a wireless communications protocol (e.g. Wifi, Bluetooth, Zigbee).

A current location of the wearable sensor may be determined, as seen at block 404. At block 406, the measure of comfort and the current location of the wearable sensor may be incorporated into a two or more dimensional comfort map of the building space maintained by the controller. These steps may be repeated over time, as indicated by line 408, as the one or more individuals having the wearable sensors move about the building space to populate the two or more dimensional comfort map over time. In some instances, as indicated at block 410, a global comfort source may be actuated, based on information within the two or more dimensional comfort map of the building space.

Figure 14:
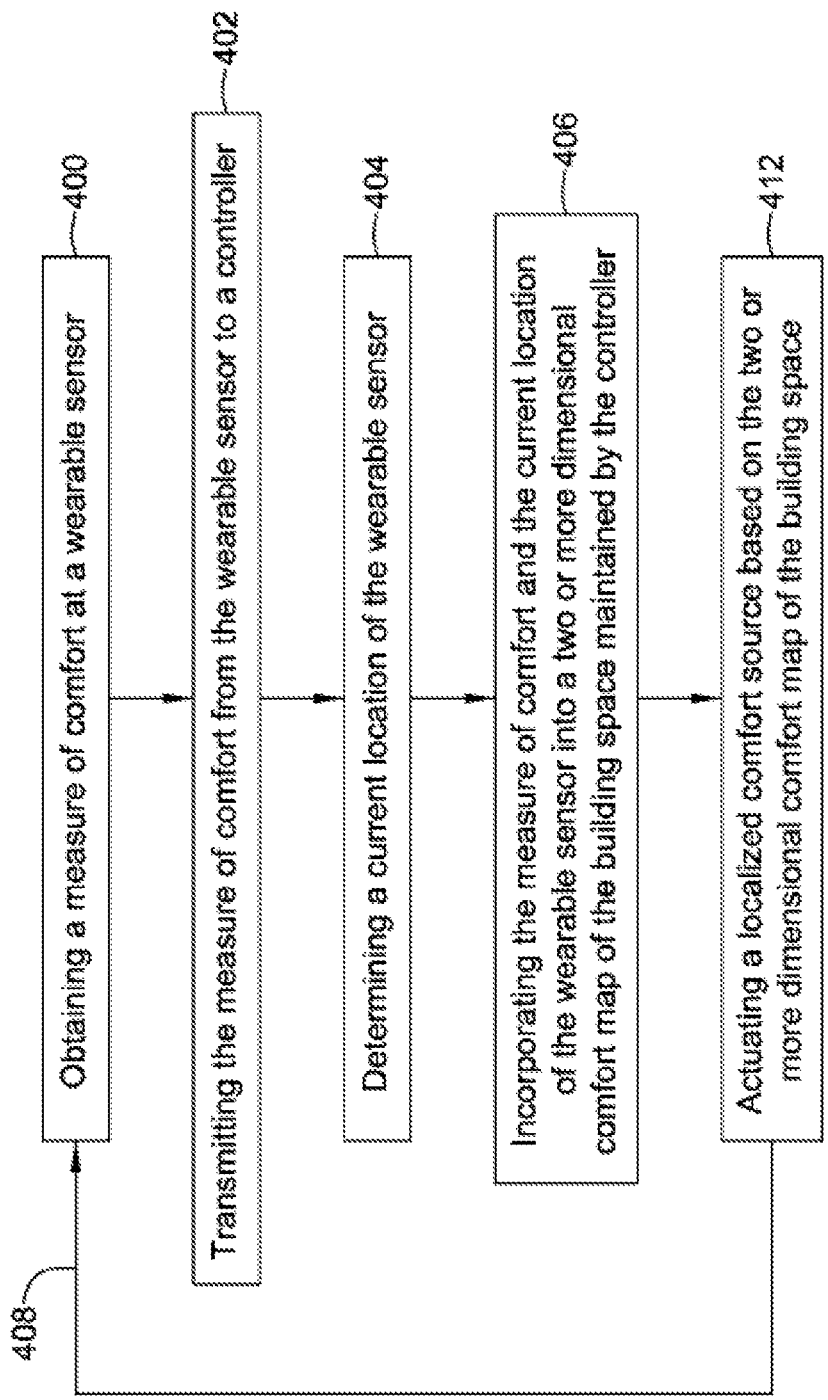

FIG. 14 shows another illustrative method of mapping comfort conditions within a building space, with one or more individuals having wearable sensors in the building space. A measure of comfort may be obtained at a wearable sensor such as the wearable sensor 314 (FIG. 10), as generally indicated at block 400. For example, the measure of comfort may be an air temperature and/or a feels like temperature. At block 402, the measure of comfort may be transmitted from the wearable sensor to a controller such as the comfort controller 302 (FIG. 10). In some cases, the wearable sensor may be configured to communicate with the comfort controller via a wireless communications protocol (e.g. Wifi, Bluetooth, Zigbee).

A current location of the wearable sensor may be determined, as seen at block 404. At block 406, the measure of comfort and the current location of the wearable sensor may be incorporated into a two or more dimensional comfort map of the building space maintained by the controller. These steps may be repeated over time, as indicated by line 408, as the one or more individuals having the wearable sensors move about the building space to populate the two or more dimensional comfort map over time. In some instances, as indicated at block 412, a local comfort source may be actuated, based on information within the two or more dimensional comfort map of the building space.

Figure 15:
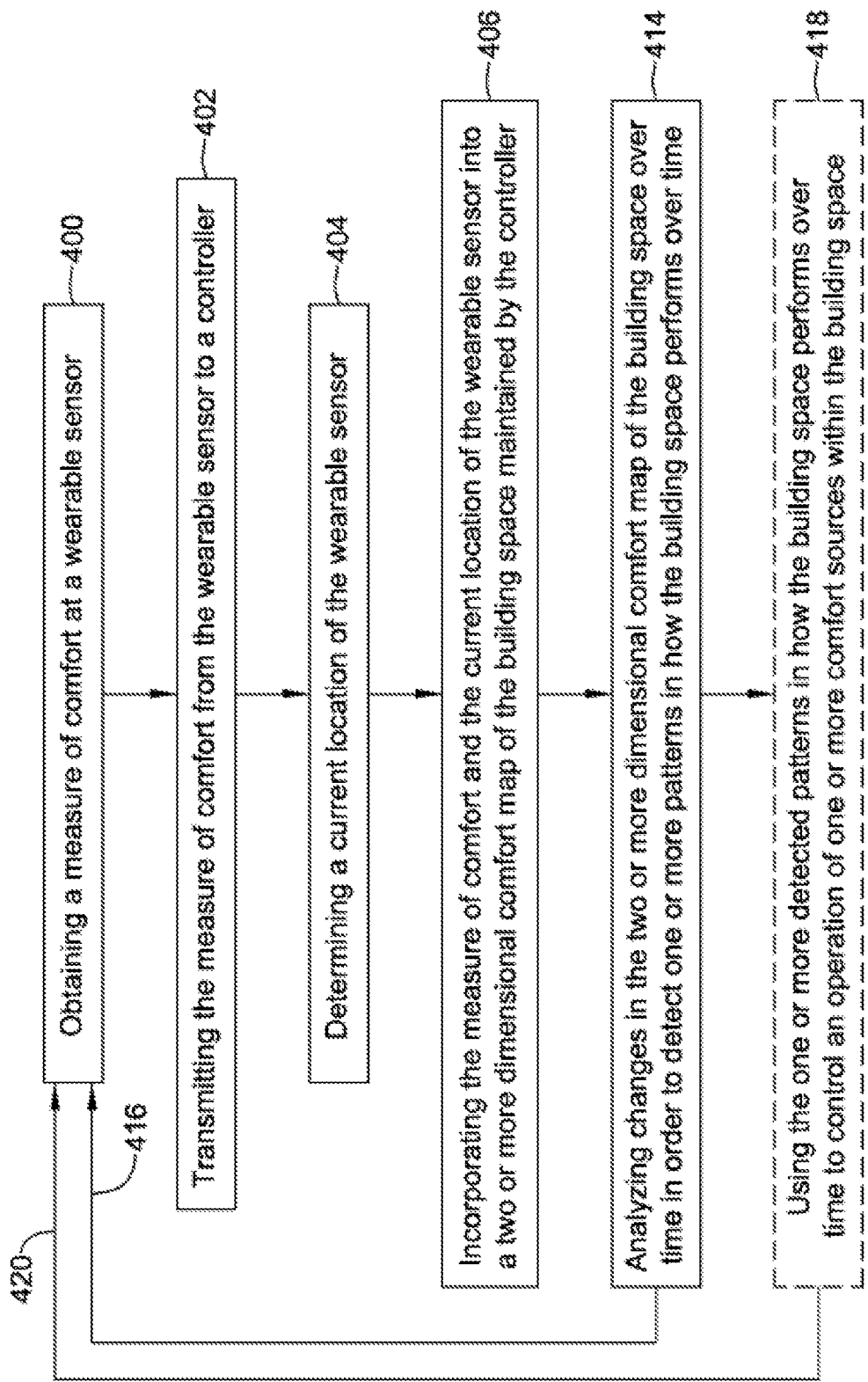

FIG. 15 shows another illustrative method of mapping comfort conditions within a building space, with one or more individuals having wearable sensors in the building space. A measure of comfort may be obtained at a wearable sensor such as the wearable sensor 314 (FIG. 10), as generally indicated at block 400. For example, the measure of comfort may be an air temperature and/or a feels like temperature. At block 402, the measure of comfort may be transmitted from the wearable sensor to a controller such as the comfort controller 302 (FIG. 10). In some cases, the wearable sensor may be configured to communicate with the comfort controller via a wireless communications protocol (e.g. Wifi, Bluetooth, Zigbee).

A current location of the wearable sensor may be determined, as seen at block 404. At block 406, the measure of comfort and the current location of the wearable sensor may be incorporated into a two or more dimensional comfort map of the building space maintained by the controller. In some instances, as seen for example at block 414, the comfort controller may analyze changes in the two or more dimensional comfort map of the building space over time in order to detect one or more patterns in how the building space performs over time. One or more of these steps may be repeated over time, as indicated by line 416, as the one or more individuals having the wearable sensors move about the building space to populate the two or more dimensional comfort map over time. In some cases, as indicated at block 418, the one or more detected patterns in how the building space performs over time may be used to control an operation of one or more comfort sources within the building space. Control may revert back to block 400, as indicated by line 420. In some cases, the outdoor temperature over time may also be incorporated in the two or more dimensional comfort map. The outdoor temperature, along with the indoor air temperature and/or a feels like temperature, may be used when detecting patterns in how the building space performs over time. Other parameter may also be used. For example, ventilation rate, indoor humidity, outdoor humidity, wind speed, wind direction, light level, solar energy level, and/or any other suitable parameter may be incorporated in the two or more dimensional comfort map of the building space, and in some cases, may be used when detecting patterns in how the building space performs over time.

Figure 16:
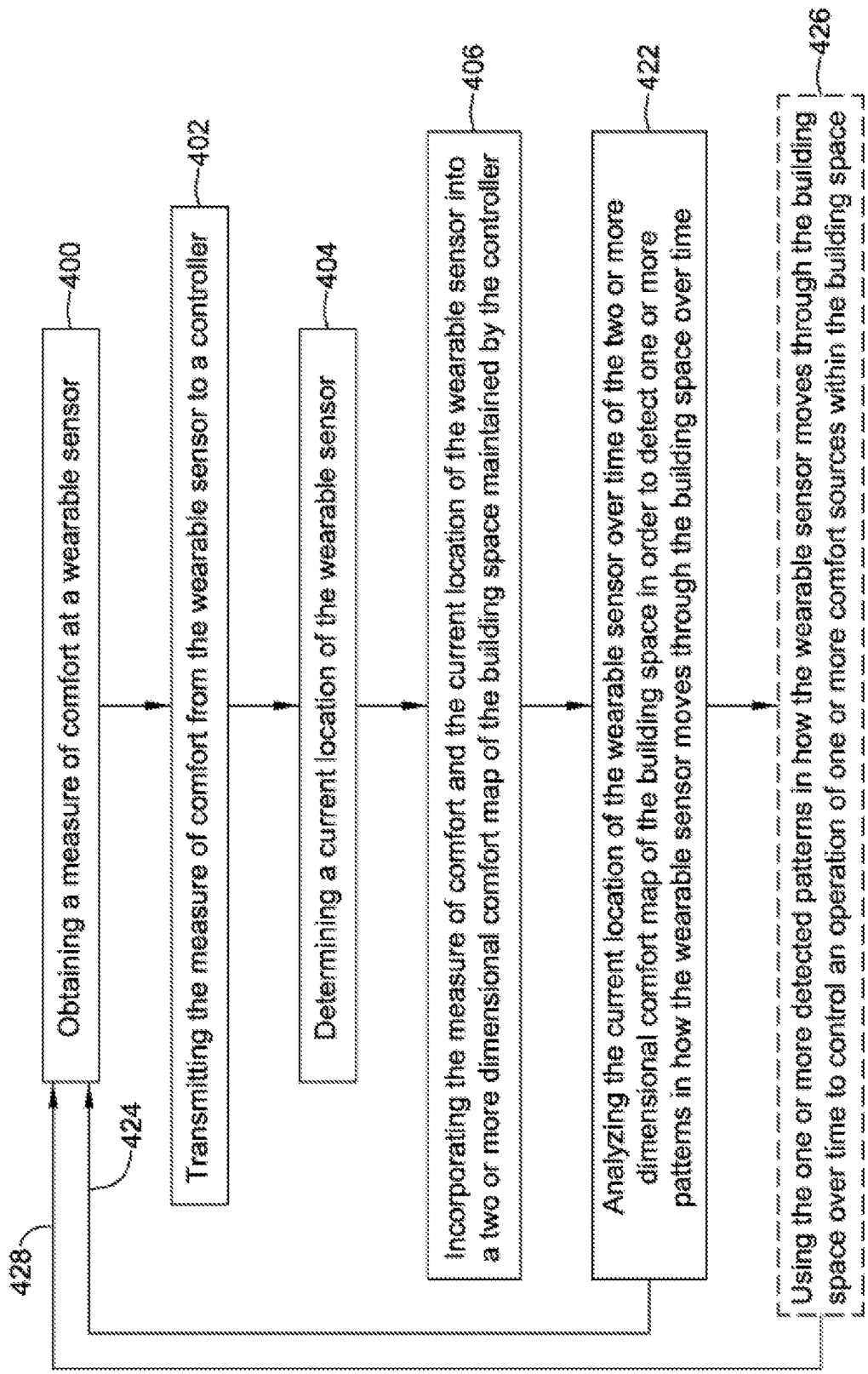

FIG. 16 shows another illustrative method of mapping comfort conditions within a building space, with one or more individuals having wearable sensors in the building space. A measure of comfort may be obtained at a wearable sensor such as the wearable sensor 314 (FIG. 10), as generally indicated at block 400. For example, the measure of comfort may be an air temperature and/or a feels like temperature. At block 402, the measure of comfort may be transmitted from the wearable sensor to a controller such as the comfort controller 302 (FIG. 10). In some cases, the wearable sensor may be configured to communicate with the comfort controller via a wireless communications protocol (e.g. Wifi, Bluetooth, Zigbee).

A current location of the wearable sensor may be determined, as seen at block 404. At block 406, the measure of comfort and the current location of the wearable sensor may be incorporated into a two or more dimensional comfort map of the building space maintained by the controller. In some instances, as seen for example at block 422, the comfort controller may analyze the current location of the wearable sensor over time in order to detect patterns in how the wearable sensor (and thus the individual wearing the sensor) moves through the building space over time. One or more of these steps may be repeated over time, as indicated by line 424, as the one or more individuals having the wearable sensors move about the building space to populate the two or more dimensional comfort map over time. In some cases, as indicated at block 426, the one or more detected patterns in how the wearable sensor moves about the building space over time may be used to control an operation of one or more comfort sources within the building space. Control may revert back to block 400, as indicated by line 428.

Figure 17:
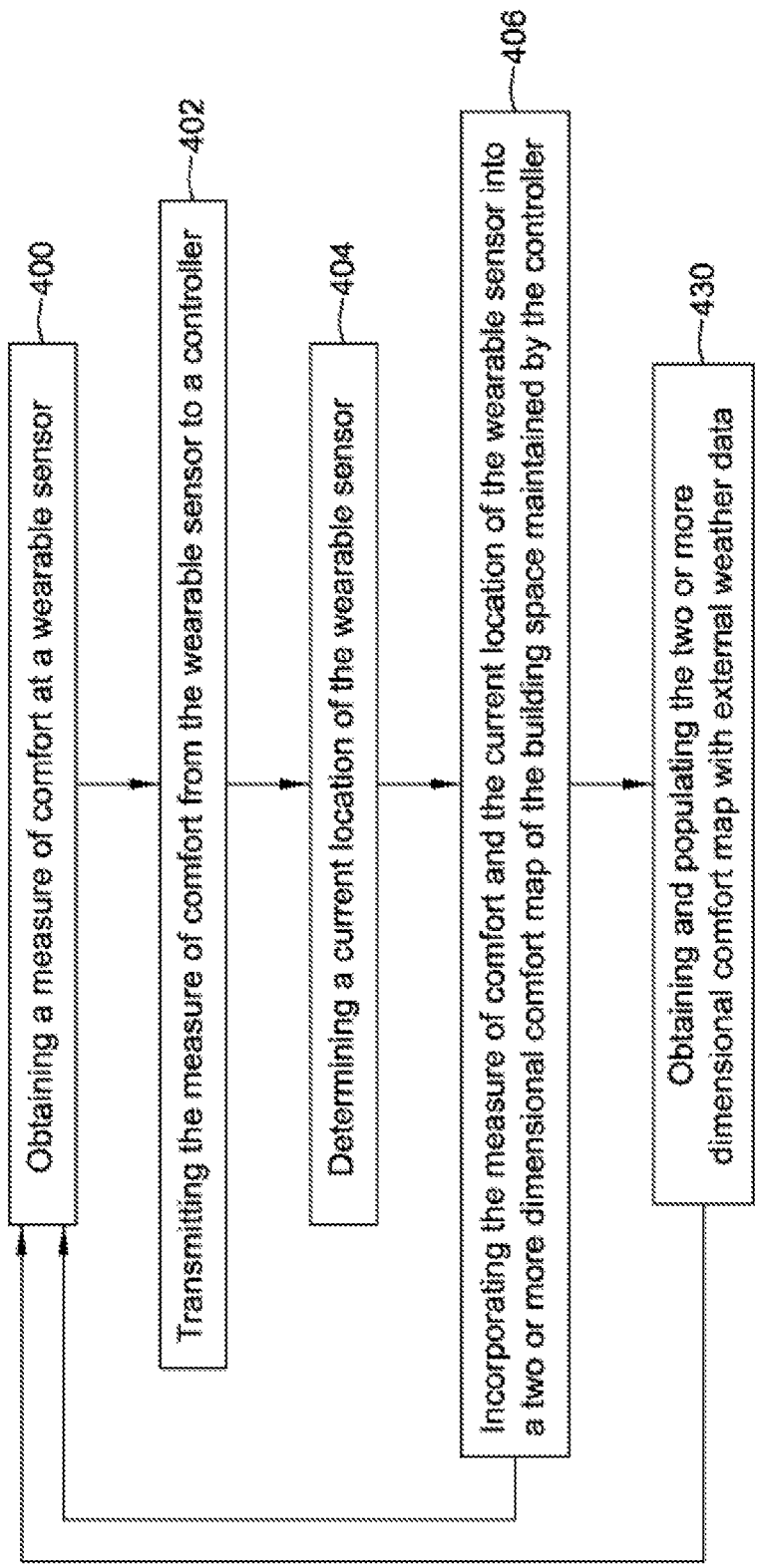

FIG. 17 shows another illustrative method of mapping comfort conditions within a building space, with one or more individuals having wearable sensors in the building space. A measure of comfort may be obtained at a wearable sensor such as the wearable sensor 314 (FIG. 10), as generally indicated at block 400. For example, the measure of comfort may be an air temperature and/or a feels like temperature. At block 402, the measure of comfort may be transmitted from the wearable sensor to a controller such as the comfort controller 302 (FIG. 10). In some cases, the wearable sensor may be configured to communicate with the comfort controller via a wireless communications protocol (e.g. Wifi, Bluetooth, Zigbee).

A current location of the wearable sensor may be determined, as seen at block 404. At block 406, the measure of comfort and the current location of the wearable sensor may be incorporated into a two or more dimensional comfort map of the building space maintained by the controller. In some instances, as seen for example at block 430, external weather data may be obtained and used to populate the two or more dimensional comfort map with external weather data. Other parameters may also be used when populating the two or more dimensional comfort map.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A method of mapping comfort conditions within a building space, one or more individuals having wearable sensors in the building space, the method comprising:
    obtaining a measure of comfort at a wearable sensor, the measure of comfort including an air temperature;

transmitting the measure of comfort from the wearable sensor to a controller configured to actuate a global comfort source and/or one or more local comfort sources;

determining, by triangulating between a plurality of wireless beacons, a spatial location of the wearable sensor in the building space corresponding to when the measure of comfort was obtained, and a time corresponding to when the measure of comfort was obtained, wherein the building space includes two or more stories, wherein the spatial location is given by three spatial dimensions (x, y and z), and wherein the spatial location is indicative of a story of the two or more stories;

incorporating the measure of comfort, the corresponding time and the corresponding spatial location of the wearable sensor in the building space into a three-dimensional comfort map of the building space maintained by the controller to correlate the measure of comfort with the corresponding spatial location and the corresponding time;

repeating the obtaining, transmitting, determining and incorporating steps as the one or more individuals having the wearable sensors move spatially about the building space in at least two spatial dimensions to populate the three-dimensional comfort map over time, wherein the three-dimensional comfort map, once populated, records a history of the measure of comfort for each of two or more different spatial locations in the building space; and actuating, by the controller, the global comfort source and/or the one or more local comfort sources based at least in part on the three-dimensional comfort map of the building space.

2. The method of claim 1, further comprising analyzing changes in the three-dimensional comfort map of the building space over time in order to detect one or more patterns in how different spatial locations of the building space performs over time.

3. The method of claim 2, further comprising actuating the global comfort source and/or the one or more local comfort sources based at least in part on the one or more detected patterns in how different spatial locations of the building space performs over time.

4. The method of claim 1, further comprising analyzing the location of the wearable sensor over time to detect one or more patterns in how the wearable sensor moves through the building space over time.

5. The method of claim 4, further comprising actuating the global comfort source and/or the one or more local comfort sources based at least in part on the one or more detected patterns in how the wearable sensor moves through the building space over time.

6. The method of claim 1, wherein the wearable sensor is configured to communicate with the controller via a wireless communications protocol.

7. The method of claim 6, wherein at least some of the plurality of wireless beacons are disposed within the one or more local comfort sources.

8. The method of claim 6, wherein at least some of the plurality of wireless beacons comprise wireless beacons separate from the one or more local comfort sources.

9. The method of claim 1, further comprising obtaining and populating the three-dimensional comfort map with external weather data.

10. A building comfort controller for controlling comfort within a building space, the building comfort controller comprising:

a memory for storing a three-dimensional comfort map of the building space that provides a history of how various portions of the building space perform over time based upon comfort data provided by a wearable sensor moving about the building space in at least three spatial directions, the three-dimensional comfort map including a plurality of map entries, wherein each map entry includes: (1) a comfort data value from the wearable sensor including the air temperature; (2) a time that corresponds to when the comfort data value was obtained; and (3) a spatial location within the building space that corresponds to when the comfort data value was obtained;

an input for receiving comfort data from the wearable sensor as well as spatial location data regarding the spatial location within the building of the wearable sensor;

an output for sending control instructions to one or more comfort sources;

a controller operably coupled to the memory, the input and the output, the controller configured to:

update the three-dimensional comfort map of the building space over time using comfort data received from the wearable sensor over time, as well as the corresponding time and spatial location;

determine the spatial location of the wearable sensor by triangulating the wearable sensor between a plurality of wireless beacons, wherein the building space includes two or more stories, wherein the spatial location is given by three spatial dimensions (x, y and z), and wherein the spatial location is indicative of a story of the two or more stories; and provide control instructions for controlling the one or more comfort sources based at least in part on the three-dimensional comfort map of the building space.

11. The building comfort controller of claim 10, wherein the one or more comfort sources comprise a controllable damper.

12. The building comfort controller of claim 10, wherein the one or more comfort sources comprise one or more localized comfort sources and one or more global comfort sources.

13. The building comfort controller of claim 12, wherein the one or more global comfort sources comprises a central HVAC system installed within the building space, and the one or more localized comfort sources comprises one or more of a gas fireplace, an electric fireplace, a space heater, an electric blanket, a ceiling fan, a floor fan, a table fan, or a window air conditioner.

14. The building comfort controller of claim 10, wherein the controller is configured to accept a floor plan uploaded via the input and to incorporate the floor plan into the three-dimensional comfort map of the building space.

15. A building space comfort system for controlling comfort within a building space, the building space comfort system comprising:

a plurality of wireless beacons disposed throughout the building space, the plurality of wireless beacons enabling triangulation of wireless signals from one or more wearable sensors in order to determine a spatial location of each of the one or more wearable sensors within the building space;

a comfort controller configured to collect a plurality of measures of comfort over time from one or more of the wearable sensors worn or otherwise carried by one or more individuals within the building space including an air temperature, along with the corresponding spatial location of the one or more of the wearable sensors and the corresponding time of collection, wherein the spatial location is given by three spatial dimensions (x, y and z), the comfort controller further configured to maintain a three-dimensional comfort map of the building space that includes a plurality of map entries, wherein the building space includes two or more stories, wherein the spatial location of the one or more wearable sensors is indicative of a story of the two or more stories, and wherein each map entry includes one of the plurality of measures of comfort collected from the one or more wearable sensors along with the corresponding spatial location and the corresponding time; and a global and/or local comfort source operably coupled to the comfort controller, the comfort controller configured to control the global and/or local comfort source based, at least in part, on the three-dimensional comfort map of the building space.

\* \* \* \* \*